(12) United States Patent
Yeh

(10) Patent No.: US 6,938,847 B1
(45) Date of Patent: Sep. 6, 2005

(54) SPOOL FOR A FISHING REEL

(76) Inventor: Shih-Yuan Yeh, No. 260, Chen-Fu Rd., Tai-Ping City, Taichung Hsien (TW)

( * ) Notice: Subject to any disclaimer, the term of this patent is extended or adjusted under 35 U.S.C. 154(b) by 13 days.

(21) Appl. No.: 10/792,507

(22) Filed: Mar. 2, 2004

(51) Int. Cl.[7] ............................................. A01K 89/02
(52) U.S. Cl. .................................................... 242/322
(58) Field of Search ................................ 242/322, 306, 242/307

(56) References Cited

U.S. PATENT DOCUMENTS

| | | | | |
|---|---|---|---|---|
| 2,457,323 A | * | 12/1948 | Sharps | 242/306 |
| 2,535,746 A | * | 12/1950 | Mitchell | 242/229 |
| 3,186,656 A | * | 6/1965 | Venable | 242/321 |
| 4,076,185 A | * | 2/1978 | Dorph | 242/118.41 |
| 4,418,877 A | * | 12/1983 | Nakajima | 242/319 |
| 5,161,751 A | * | 11/1992 | Bolcavage | 242/322 |
| 6,412,724 B1 | * | 7/2002 | Ferrara, Jr. | 242/322 |
| 6,467,712 B1 | * | 10/2002 | Cribb | 242/322 |
| 6,533,203 B2 | * | 3/2003 | Hitomi et al. | 242/322 |

* cited by examiner

*Primary Examiner*—Emmanuel Marcelo
(74) *Attorney, Agent, or Firm*—The Maxham Firm

(57) ABSTRACT

A spool has a cylindrical body, a central hole and two recesses. The central hole is defined through the cylindrical body to define two openings respectively at two ends of the cylindrical body. The line recesses are defined in the outer surface of the cylindrical body for two different fishing lines to respectively wound around. Accordingly, the spool is able to simultaneously receive two kinds of fishing lines to improve convenience in use.

5 Claims, 5 Drawing Sheets ary to that of the other line recess (12,122).
SPOOL FOR A FISHING REEL

BACKGROUND OF THE INVENTION

1. Field of the Invention

The present invention relates to a spool, and more particularly to a spool for a fishing reel and that has two line recesses for simultaneously and respectively receiving different fishing lines.

2. Description of Related Art

A fishing reel enables an angler to cast a line and bait far from the standing position whereby the angler has a huge ability to reach fish that may otherwise be unobtainable. A conventional fishing reel substantially comprises a body, a rotating arm, a spool, a driving mechanism and a bale arm. The body has an axle extending out from a side of the body and a rod reciprocally extending from a front of the body. The rotating arm is rotatably attached to the body via engagement with the axle. The spool is detachably attached to the rod and has a recess for receiving a fishing line. The spool can be detached from the rod, such that an angler can replace the spool with another spool with a different fishing line to the body for different needs. The driving mechanism is mounted in the body for being driven by the rotating arm to rotate the bale arm around the spool so as to reel fishing line around the spool. A simple clutch device is fitted to the body whereby the spool can rotate under a specified tension so that if a fish suddenly swims hard, the line does not break because it is released via the clutch.

However, the conventional spool only has one line recess for receiving a single fishing line. To catch different kinds of fish, different kinds of fishing lines are always needed. Therefore, an angler always carries multiple spools respectively wound with different kinds of fishing lines for different conditions. This will take a large space for the angler carrying multiple spools, so the conventional spool is inconvenient and not versatile in use. Furthermore, locating a second spool, removing the first spool and fitting the second, and then putting the first spool safely away is troublesome and time-consuming at a time when the fish may be feeding.

To overcome the shortcomings, the present invention tends to provide a spool to mitigate or obviate the aforementioned problems.

SUMMARY OF THE INVENTION

The main objective of the invention is to provide a spool that is able to simultaneously receive two kinds of fishing lines to improve convenience in use. The spool has a cylindrical body, a central hole and two line recesses. The central hole is defined through the cylindrical body to define two openings respectively at two ends of the cylindrical body. The line recesses are defined in the outer surface of the cylindrical body for two different fishing lines to be wound around there respectively.

Other objects, advantages and novel features of the invention will become more apparent from the following detailed description when taken in conjunction with the accompanying drawings.

DETAILED DESCRIPTION OF PREFERRED EMBODIMENT

Figure 1:
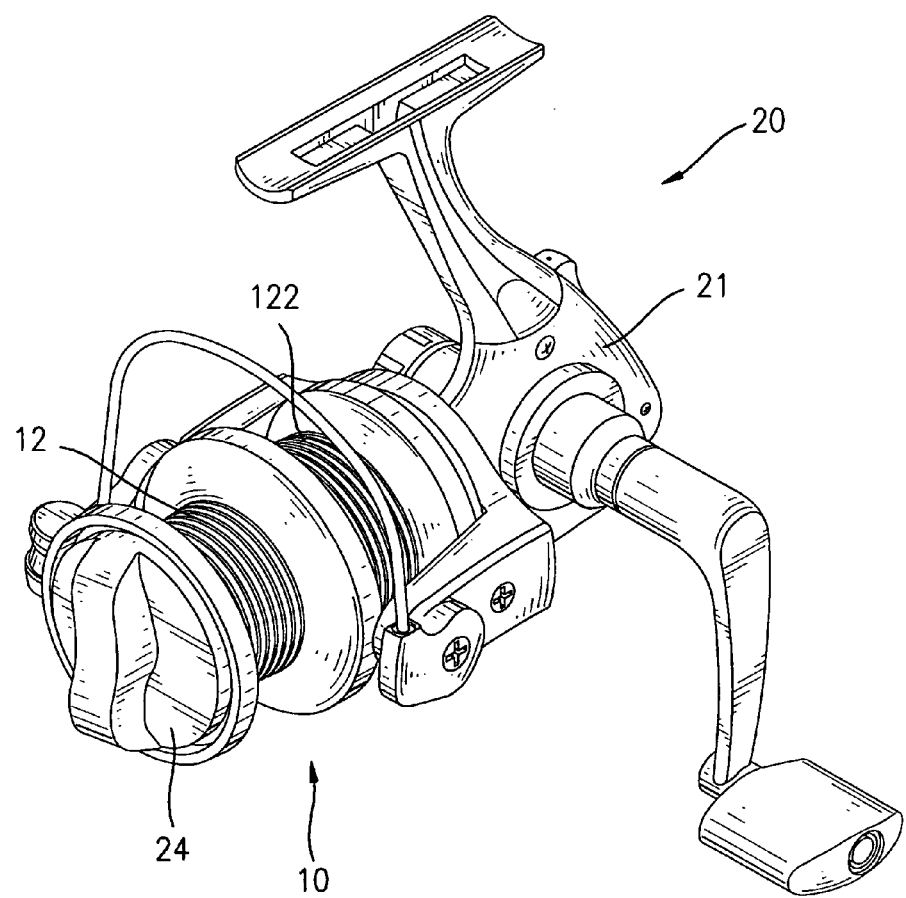
FIG. 1 is a perspective view of a fishing reel with a spool in accordance with the present invention.
Figure 2:
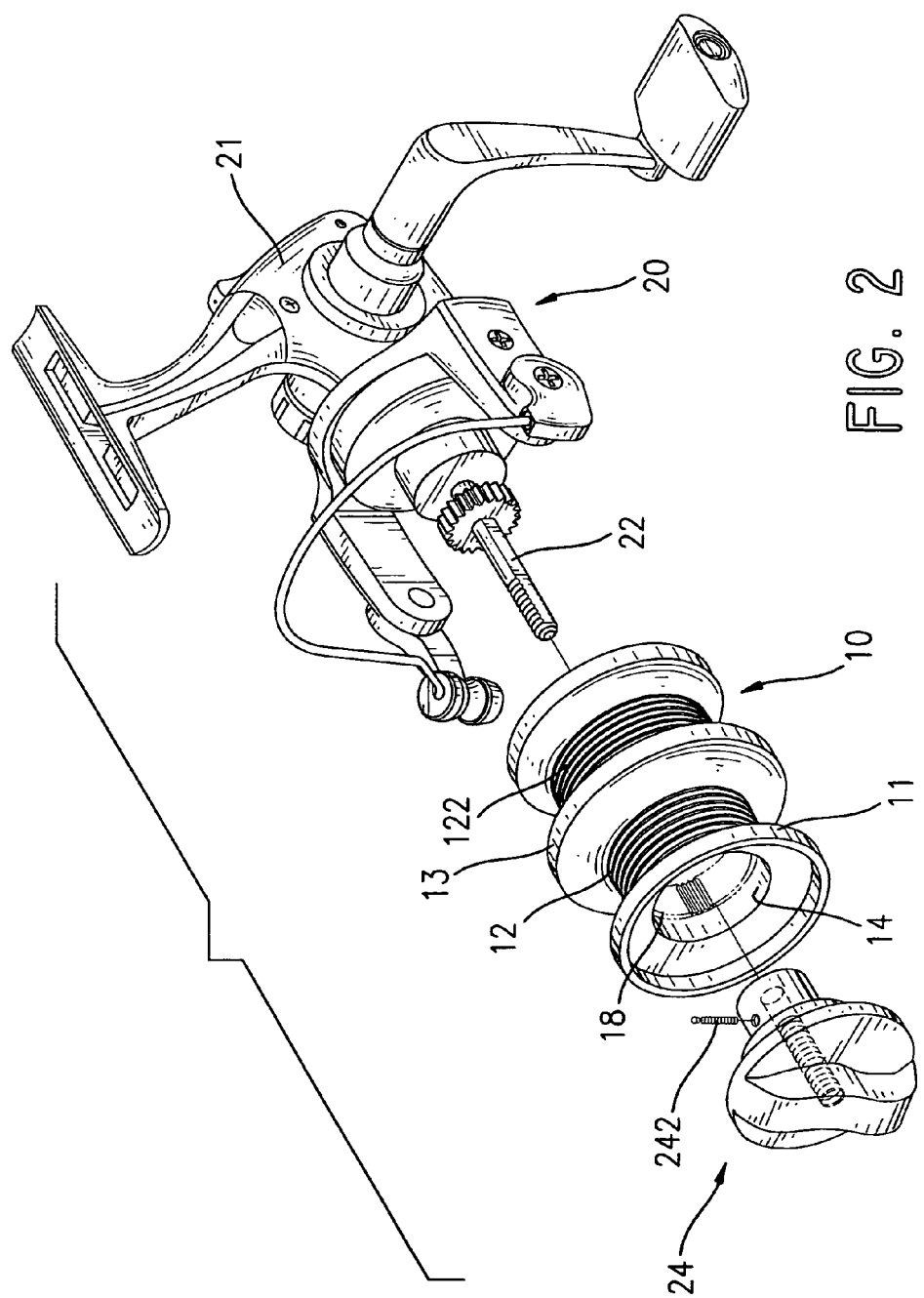
FIG. 2 is an exploded perspective view of the fishing reel with the spool in FIG. 1.
Figure 3:
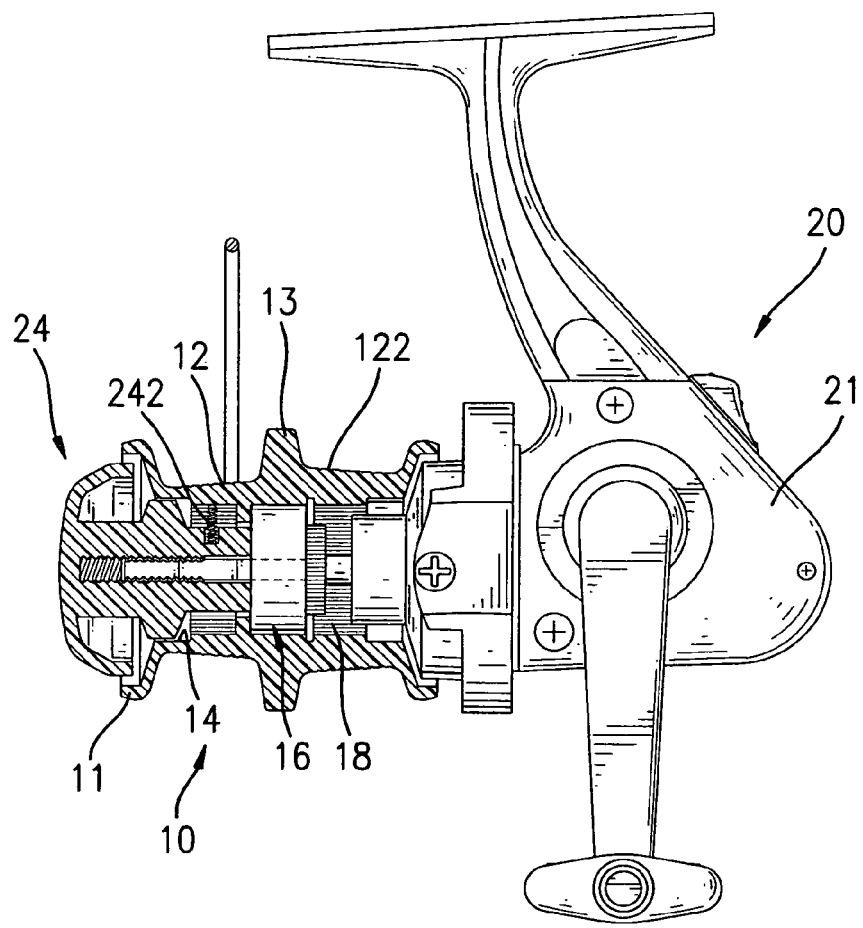
FIG. 3 is a side plan view in partial cross section of the fishing reel with the spool in FIG. 1.

With reference to FIGS. 1 to 3, a spool (10) for a fishing reel (20) in accordance with the present invention comprises a cylindrical body (11), a central hole (14) and two line recesses (12,122). The cylindrical body (11) has two ends (not numbered), an outer surface (not numbered) and a middle portion (not numbered). The central hole (14) is defined through the cylindrical body (11) to define two openings (not numbered), a first opening and a second opening, respectively at the ends. The line recesses (12,122) comprise a first line recess (12) and a second string recess (122) which are defined in the outer surface for receiving fishing lines respectively. The first line recess (12) corresponds to the first opening of the central hole (14), and the second line recess (122) corresponds to the second opening. In an optional embodiment, an annular wall (13) is formed on the outer surface of the cylindrical body (11) between the line recesses (12,122). Each line recess (12,122) has a depth different to that of the other line recess (12,122).

Figure 4:
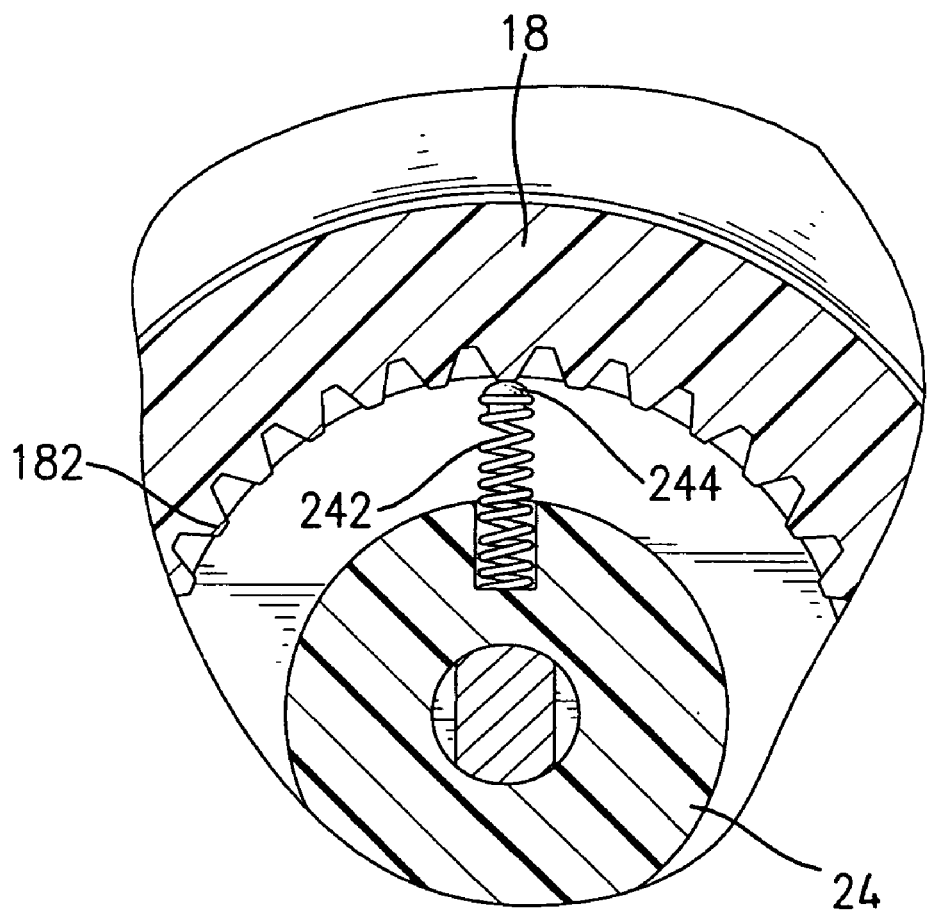
FIG. 4 is an enlarged cross sectional side plan view of the spool and the securing cap of the fishing reel in FIG. 1.

In addition, the spool (10) may further have two clutch devices (18) mounted in the central hole (14) and corresponding to the line recesses (12,122). Each clutch device (18) has an inner surface and multiple teeth (182) formed on the inner surface, as shown in FIG. 4. An abutting element (16) is mounted in the central hole (14) at the middle portion. In an optional embodiment, the abutting element (16) is a brake device that has a structure same as a conventional one and is not further described. In an alternative embodiment, the abutting element is an annular rib formed in the central hole (14) at the middle portion.

To assemble the spool (10) to a body (21) of the fishing reel (20), the rod (22) extending from the body (21) extends into the central hole (14) in the cylindrical body (11) through one of the openings, for example the second opening. A securing cap (24) is then inserted into the central hole (14) from the first opening and is screwed with the rod (22). The securing cap (24) has one end abutting against one side of the abutting element (16), and a disk (not numbered) is mounted on the rod (22) to abut against the other side of the abutting element (16). Consequently, the abutting element (16) is compressed between the securing cap (24) and the disk and is mounted on the rod (22). Accordingly, the angler can use the fishing line received in the first line recess (12) for fishing.

Figure 5:
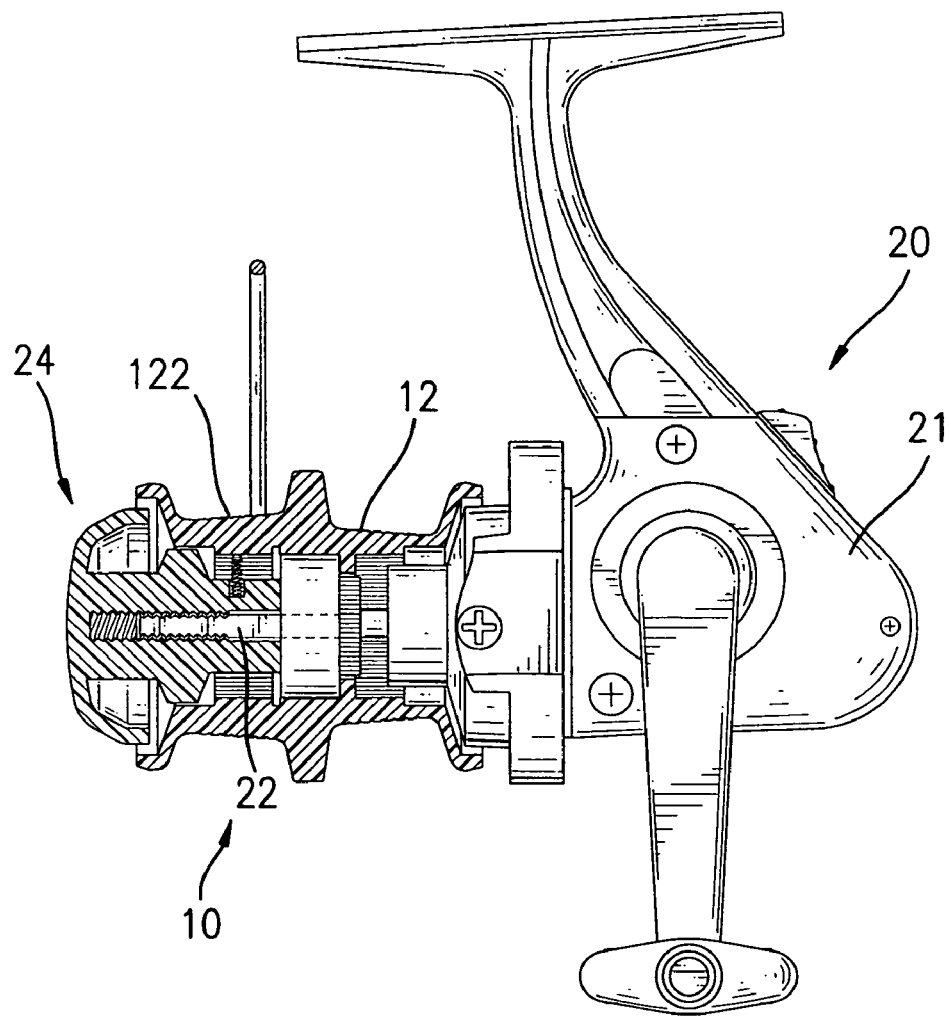
FIG. 5 is a side plan view in partial cross section of the fishing reel with the spool in FIG. 1 showing that the direction of the spool is changed to make the fishing line received in another line recess is used.

If the angler wants to use the other fishing line received in the second line recess (122), with further reference to FIG. 5, the securing cap (24) is firstly detached from the rod (22). The spool (10) is taken off the rod (22) and is reversed to receive the rod (22) through the first opening. After the securing cap (24) is securely attached to the rod (22) on the second opening, the user can use the fishing line received in the second line recess (122) for fishing. Therefore, the angler can use two different kinds of fishing lines on a single spool (10) easily and conveniently, such that the space for carrying different kinds of fishing lines is reduced.

In addition, with further reference to FIG. 4, a spring (242) is mounted on the securing cap (24) and a ratchet (244) is supported on the spring (242) and abuts against the teeth (182) on the corresponding one of the collars (18). With the contact between the ratchet (244) and the teeth (182) of the corresponding collar (18), sound will occur during the operation of the fishing reel to alert the angler to the fact that the fish is exerting extra strength.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A spool for a fishing reel comprising:
    a cylindrical body with two ends, an outer surface and a middle portion;
    a central hole defined through the cylindrical body to define two openings respectively at the ends;
    two line recesses defined in the outer surface for receiving two fishing lines respectively; and
    two collars mounted in the central hole and corresponding respectively to the line recesses, wherein each collar has an inner surface and multiple teeth formed on the inner surface.

2. The spool as claimed in claim 1, wherein each line recess has a depth different from that of the other line recess.

3. The spool as claimed in claim 2 further comprising an annular wall formed on the outer surface of the cylindrical body between the line recesses.

4. The spool as claimed in claim 1 further comprising an abutting element mounted in the central hole at the middle portion.

5. The spool as claimed in claim 1 further comprising an annular wall formed on the outer surface of the cylindrical body between the line recesses.

* * * * *